Aug. 28, 1951 P. J. ESTERLINE 2,565,600
HYDRAULIC CONTROL MECHANISM FOR MACHINE TOOLS
Filed Feb. 5, 1945 5 Sheets-Sheet 1

INVENTOR
Paul J. Esterline
ATTORNEYS

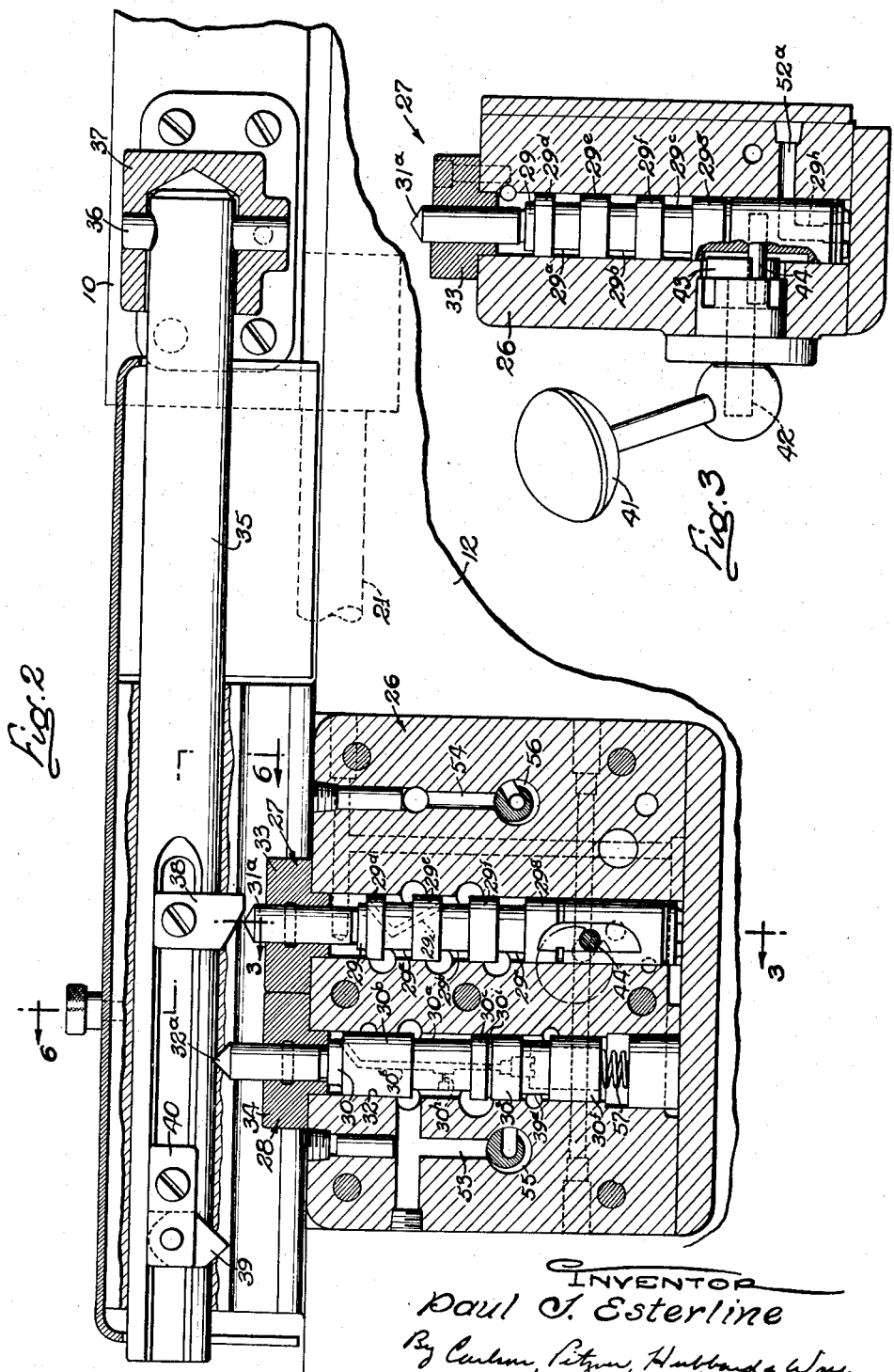

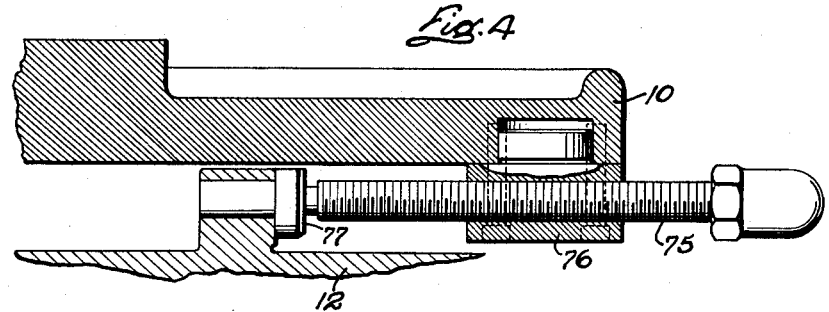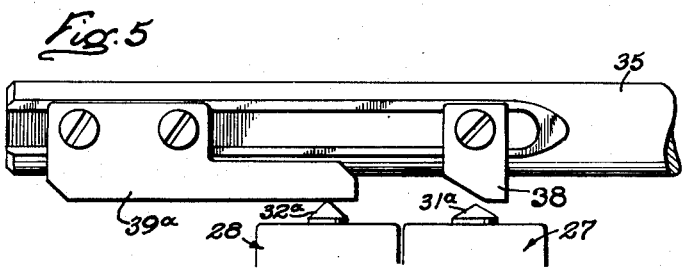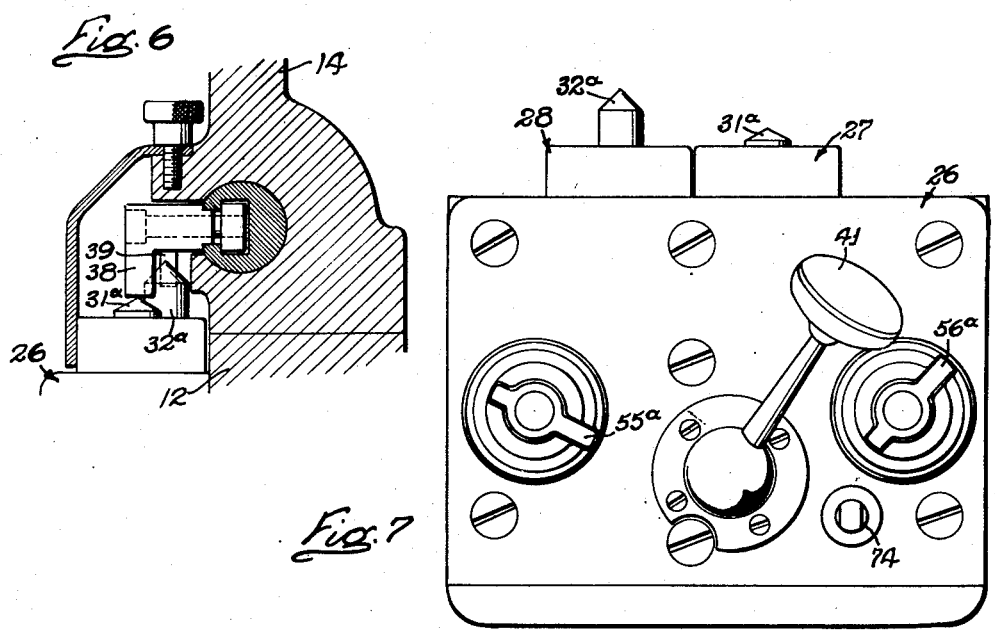

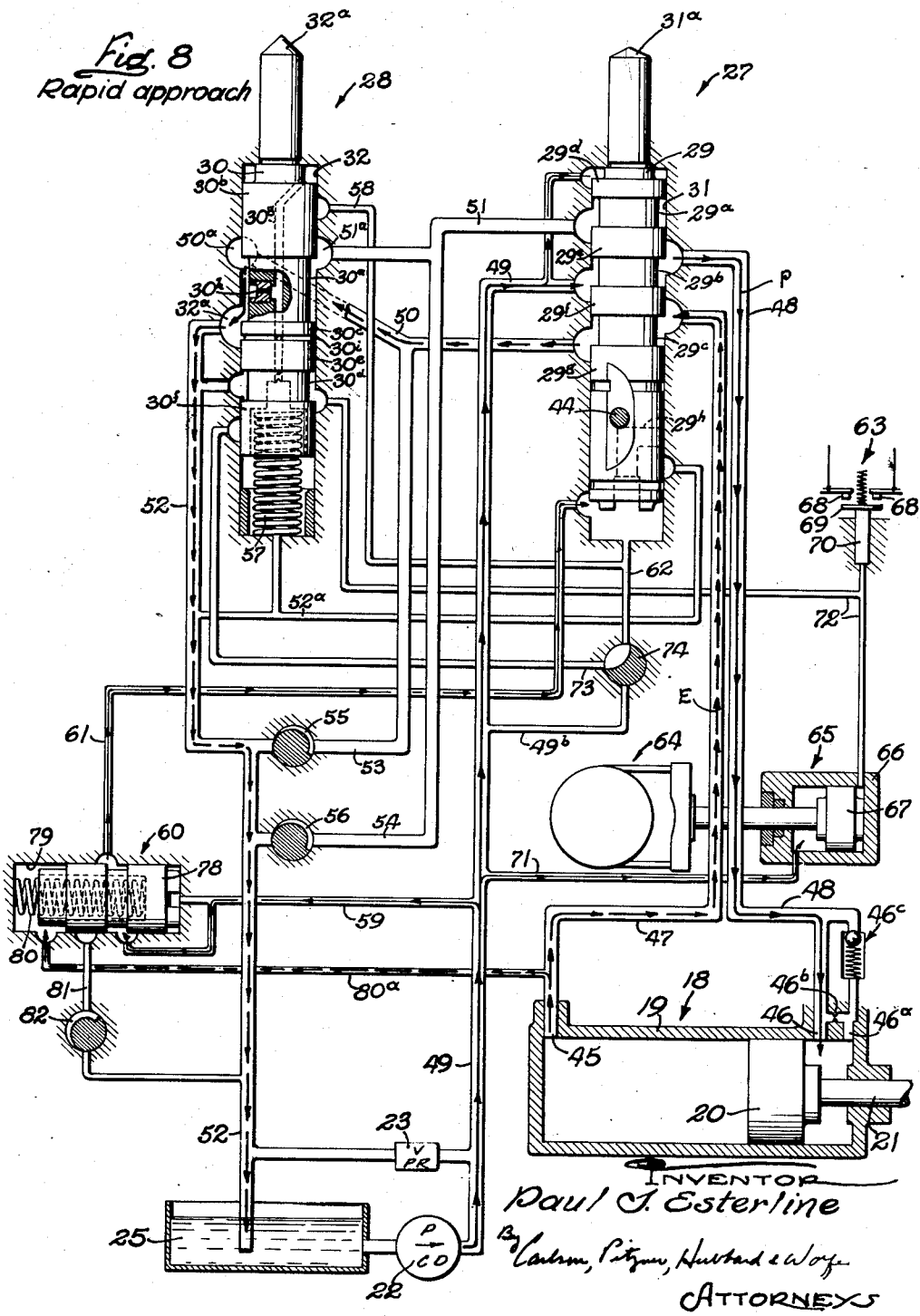

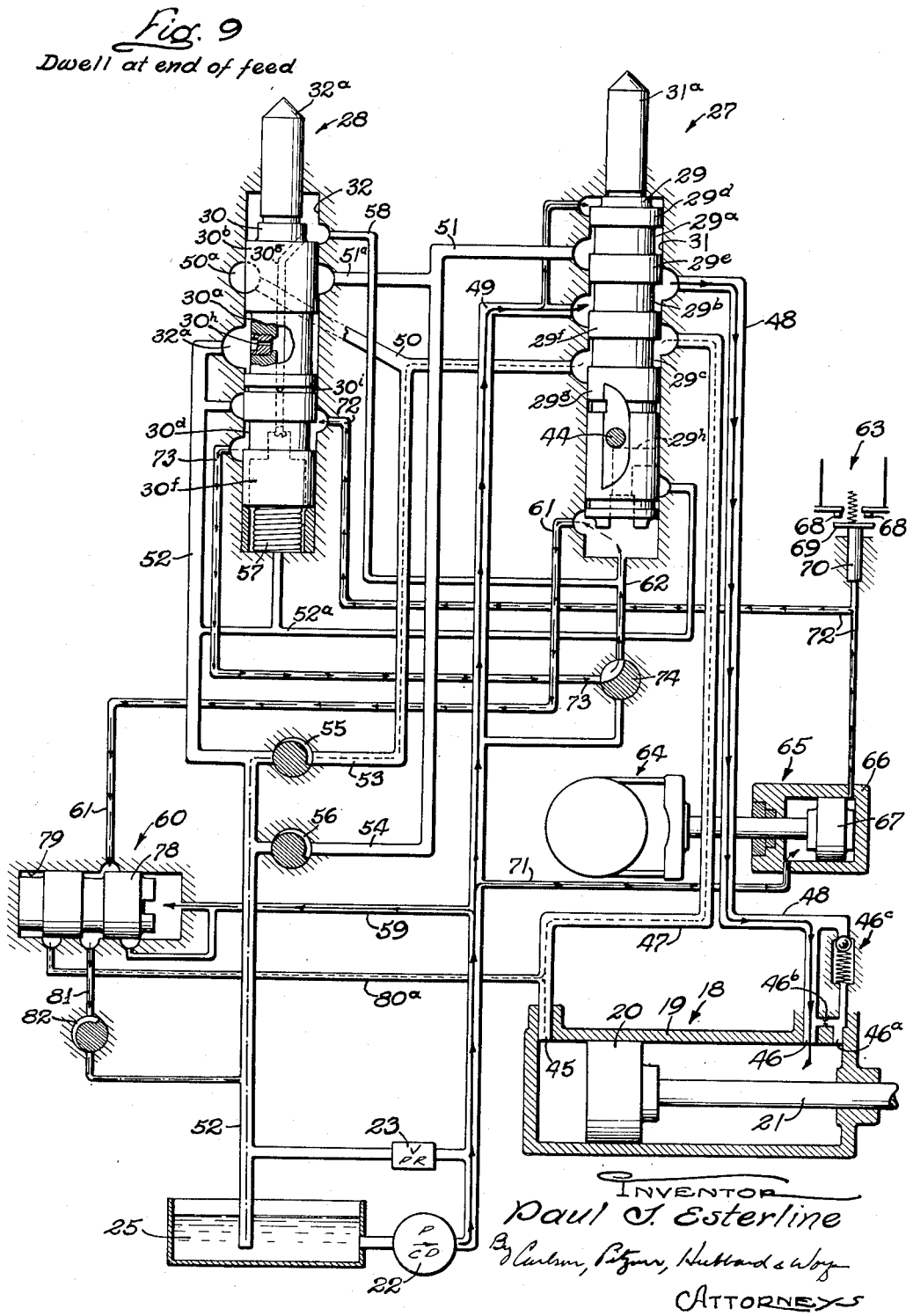

Patented Aug. 28, 1951

2,565,600

UNITED STATES PATENT OFFICE 2,565,600

HYDRAULIC CONTROL MECHANISM FOR MACHINE TOOLS

Paul J. Esterline, Detroit, Mich., assignor to Ex-Cell-O Corporation, Detroit, Mich., a corporation of Michigan Application February 5, 1945, Serial No. 576,250

13 Claims. (Cl. 121—45)

The present invention pertains to control mechanisms for hydraulic propelling systems such as are used, for example, in machine tools. Such systems normally incorporate an actuator means such as a fluid motor and a suitable source of pressure fluid. By properly controlling, in various ways, the amount of fluid supplied to or expelled from the actuator the speed and direction of movement of the actuator are determined.

One general object of the invention is to provide a simplified and economical set of controls for such a system which is adapted to accomplish highly versatile automatic cycling of the actuator with full automatic control of direction and speed and yet require but relatively few control parts for the purpose.

More particularly, it has an object to afford such a control employing but a single pair of two-position control valves, one an automatically reset speed change valve and the other a reversible direction valve. Wholly eliminated is the complication of pilot resets as well as the necessity for even a start-stop valve.

Another object is to provide in a hydraulic system a novel dwell mechanism for reversal, the same being adapted for actuation in response to the diminution in back pressure incident to bringing the actuator up against a fixed stop at the end of its path of travel.

Further objects and advantages of the invention will become apparent as the following description proceeds, taken in connection with the accompanying drawings in which:

Fig. 2 is an enlarged fragmentary sectional view taken substantially along the line 2—2 in Fig. 1 and showing the interior of a hydraulic control panel secured to the side of the machine.

Fig. 3 is a detail vertical sectional view taken substantially along the line 3—3 in Fig. 2.

Fig. 4 is a fragmentary detail sectional view taken substantially along the line 4—4 in Fig. 1 and showing the adjustable stop mechanism for limiting the travel of the machine tool table in one direction.

Fig. 5 is a side elevation of a modified dog mechanism which may be substituted for that appearing in Fig. 2 for operating the control valves for certain types of cycles, particularly when a reverse feed is desired in the machine.

Fig. 6 is an enlarged fragmentary detail sectional view taken substantially along the line 6—6 in Fig. 2 and showing the dog mechanism of the latter figure in end elevation.

Fig. 7 is a face view of the control panel applied to the side of the machine and appearing in vertical longitudinal section in Fig. 2, as well as in vertical transverse section in Fig. 3.

Figs. 8 and 9 are schematic showings of the hydraulic system for the machine and with the parts positioned, respectively, for rapid approach movement of the machine tool table and dwell of the table at the end of the forward feed movement of the latter.

Figure 1:
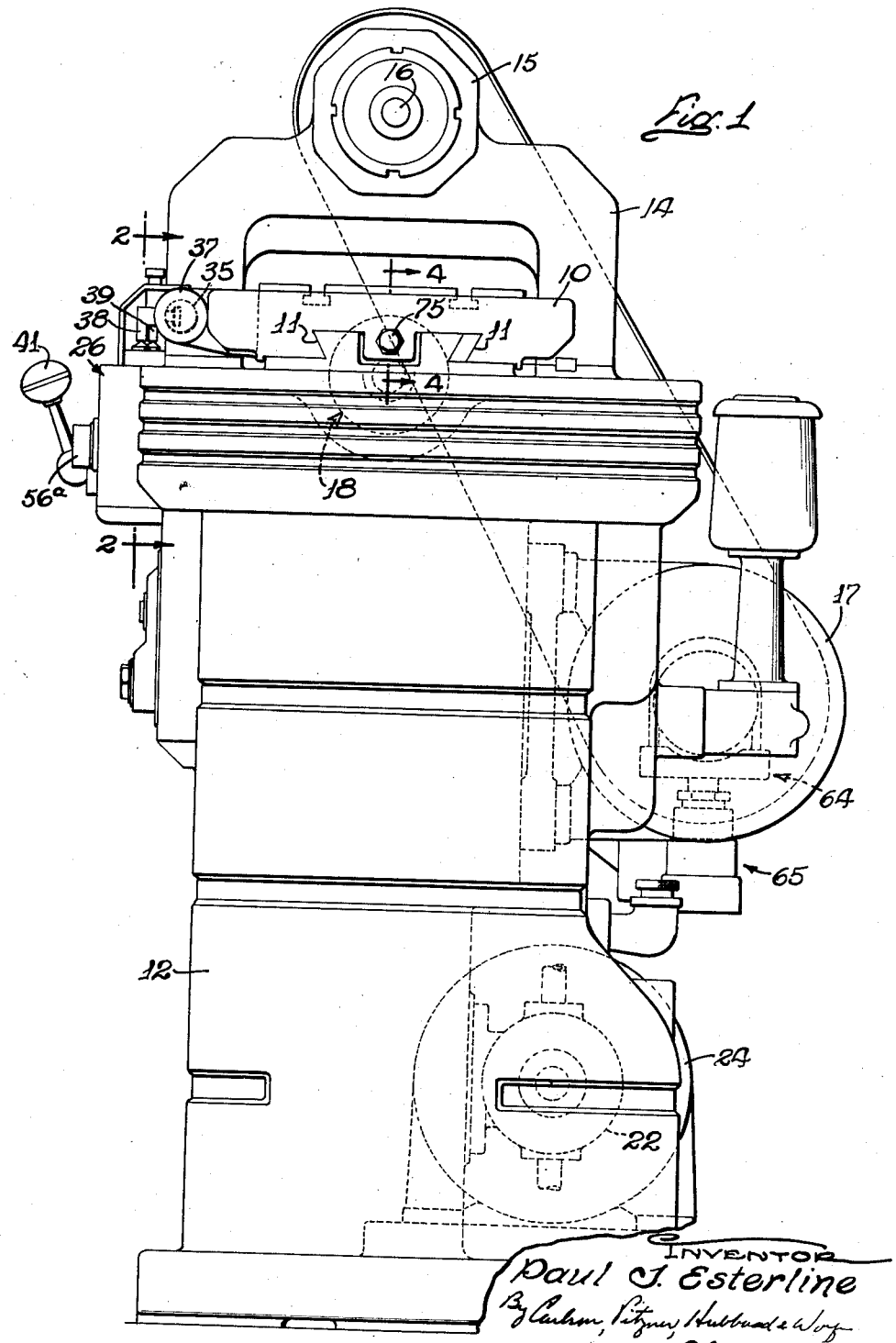
Figure 1 is an end elevation of a hydraulically operated machine tool, in this instance a horizontal boring machine, equipped with control mechanism embodying the present invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention has been exemplified therein as embodied in the controls of a hydraulically operated diamond boring machine which appears in Fig. 1. This is but one of a greater variety of machines in which controls embodying the present invention find utility. Accordingly, only so much of the machine and its operation need be described as to make plain the purposes and functions of the controls.

Of the machine shown, it will be observed that it includes a table 10 slidable endwise (toward the observer in Fig. 1) along dovetail ways 11 rigid with the top of a generally rectangular boxlike base 12. Arching over the table at one end of the base is a bridge 14 carrying a housing 15 from which projects a tool spindle 16 driven by an electric motor 17. A suitable tool may be fixed to the spindle to operate on a workpiece carried by the table 10 (neither the tool nor the work are shown). Desirably the table moves the work at a slow, carefully selected feed speed during actual boring or other machining and traverses it rapidly in approaching the work to the tool or carrying it away from the same. For further particulars as to the construction of machines of the general style here selected for purposes of illustration, reference may be made to Carroll R. Alden Patents Nos. 2,000,553 and 2,233,571.

The table 10 is reciprocated by hydraulic actuator 18, here shown (Figs. 1, 8 and 9) as being of the piston and cylinder type and comprising a piston 20 having a piston rod 21 rigid with the underside of the table 10, and a cylinder 19 in which the piston is slidable, the cylinder being fixed to the base 12. Pressure fluid such as oil is supplied to the system from a suitable source here shown as comprising a constant displacement pump 22 equipped with a working pressure relief valve 23. The pump is driven by a motor 24 (Fig. 1) and draws fluid from a reservoir 25 (Figs. 8 and 9). The valve 23 may be of the familiar spring biased type arranged to spill fluid continuously back into the reservoir to maintain a constant delivery pressure for the pump.

The novel control mechanism herein disclosed has in the present instance been illustrated as incorporated in a panel type assembly. Upon reference to Figs. 1 and 2 it will be seen that a panel 26 constituted by a solid metal slab having suitable interiorly located passages is fixed to the side of the machine base 12 adjacent the path of travel of the table 10. Most of the passages for fluid in the hydraulic system are comprised within the body of the panel. Comprised in this panel assembly are a pair of two-position control valves, one being a direction valve 27 and the other a speed valve 28. They include respective spool type plungers 29, 30 slidable within bores 31, 32 opening from the top of the panel 26, the upper ends of the bores being closed by bushings 33, 34 through which upwardly protruding nose portions 31a, 32a of the plungers project.

Coacting with the valves 27, 28 are dog means on the table 10 adapted to override the protruding plunger ends 31a, 32a and depress the same. In the illustrative construction a dog supporting bar 35 (Fig. 2) is fixed by a pin 36 to a bracket 37 on the side of the table 10. Carried by the bar 35 is a first dog 38 for operation of the direction valve 27 as well as a second dog 39 for operation of the speed valve 28. Both dogs are adjustable endwise of the rod 35 to vary the points in the path of travel of the table at which the corresponding valves are actuated. The dog 39 is of the pivoted or one-way type and coacts with a stop block 40 which prevents it from swinging to the right beyond the position shown, although the dog can swing freely to the left. Consequently, the dog 39 will depress the plunger of valve 28 only when the table is moving to the left and will ride over the plunger freely when the table is moving to the right. The two valves 27, 28 are laterally offset with respect to each other, as shown in Fig. 6, so that the dog for one will not interfere with the other.

The speed valve 28 is operated entirely by automatic means including not only the table-borne dog 39 but also an automatic resetting arrangement later described herein. The direction valve 27, on the other hand, is equipped with a manual operating lever 41 that is used in shifting the valve to initiate cycling of the machine, and can moreover be used for manual reversal when desired. The operating handle 41 is rigid with a rockable shaft 42 (Fig. 3) on which is fixed a disk 43 (see also Fig. 2) slotted to receive a pin 44 projecting laterally from the plunger 29 of the valve 27. Oscillation of the operating handle thus serves to raise and lower the valve plunger between its upper and lower limit positions.

In analyzing the controls and their interconnection, it will be useful first of all to examine the basic hydraulic circuit. As shown schematically in Fig. 8, the actuator cylinder 19 has supply ports or passages 45, 46 at its opposite ends connected by conduits 47, 48 with the direction valve 27. Also leading to this valve is a pressure supply line 49 from the pump 22 and a pair of drain or exhaust lines 50, 51. The direction valve 27 serves to connect alternate ones of the actuator lines 47, 48 to the pressure line 49 and the remaining one to one of the exhaust passages 50, 51 so as to effect delivery and exhaust of fluid to the cylinder for urging the piston 20 for movement in corresponding opposite directions. For that purpose annular grooves 29a, 29b, 29c are provided in the valve plunger 29 intermediate lands 29d, 29e, 29f, 29g and properly spaced with reference to the ports in which the passages 47, 48, 49, 50 and 51 terminate.

The speed valve 28 is interposed between the exhaust passages 50, 51 and a main exhaust passage or line 52 leading to the reservoir 25. The speed valve 28 in its alternate positions serves to open communication between the passages 50, 51 and the passage 52 or to block such communication. When in its blocking position all fluid expelled from the actuator 19 through the one of the passages 50, 51 which happens to be in operation is thus diverted through the corresponding one of a pair of passages 53, 54 which by-pass the speed valve 28 and in which are interposed corresponding ones of a pair of adjustable restricted orifices 55, 56. When the exhaust fluid has a substantially unrestricted return path to the reservoir 25, the piston 20 moves at a rapid traverse rate, whereas when the exhaust fluid has to pass through one of the restricted orifices 55, 56, the fluid is metered slowly through the orifice so that the piston moves at a slow feed rate determined by the setting of the orifice. The restricted orifices may be of conventional rotatably adjustable form and are settable by means of operating handles 55a, 56a on the front of the panel (see Fig. 7).

To accomplish the desired alternate blocking and opening of communication between the pair of exhaust passages 50, 51 and the main exhaust passage 52, the speed valve plunger 30 is provided with an annular groove 30a intermediate lands 30b, 30c spaced apart properly with reference to the porting of the valve. When the plunger 30 is in its outthrust or uppermost position shown in Fig. 8, communication is open between the ports 50a and 51a in which the passages 50, 51 terminate, through the annular groove 30a to the terminus of the passage 52. When the plunger 30 moves down to its alternate or depressed position, however, the land 30b blocks the ends of the passages 50, 51, cutting off their communication to the passage 52, although leaving the latter open to the plunger groove 30a for a purpose which will later appear.

From the foregoing it will be perceived that the direction of actuator movement can be reversed simply by shifting the direction valve 27, whereas the actuator speed can be changed from rapid traverse to feed or vice versa simply by shifting the speed valve 28. When the machine is standing idly with the table 10 in starting position, it is retained in such position by fluid pressure holding the piston 20 against a fixed abutment (in the present instance the righthand end of the cylinder 19) and excess fluid simply spills through the relief valve 23. No separate start-stop valve need be used.

The most common cycle required for a machine of the type illustrated consists of a rapid advance of the table followed by a slow feed movement in the same direction, reversal of the table and rapid return of the same to starting position with automatic stoppage of the table at the completion of the return movement. For such a cycle a control dog set-up like that illustrated in Fig. 2 may be employed with the present controls. To initiate the cycle, the operator has only to swing the control handle 41 to the left, thereby raising the plunger 29 of the direction valve 27 to its outthrust position (Fig. 8), whereupon the machine automatically executes the desired cycle. Assuming the speed valve 28 to be in its upper or outthrust position (the arrangement for automatically resetting it to that position will later appear), then shifting the direction valve 27 to its upper position conditions the circuit as shown in Fig. 8 for rapid advance of the table 10.

During rapid advance, fluid passes from the pump 22 through the line 49, through the direction valve 27, and thence through the line 48 to the righthand end of the actuator 18, as indicated by the continuous arrow line P. The piston 20 is then moved to the left expelling fluid ahead of it through the line 47, direction valve 27, exhaust passage 50, speed valve 28, and finally through the passage 52 back to the reservoir 25 as indicated by the broken arrow line E. The return passage for fluid from the actuator being substantially unrestricted, the table moves at a rapid rate.

At the point where it is desired that slower feed movements shall begin, the dog 39 overrides the upwardly projecting end 32a of the speed valve 28, forcing the plunger 30 of this valve downward to its lowered position against the bias of a compression spring 57 which normally urges the plunger upward. As the speed valve plunger 30 moves downward, the land 30b opens a port at the end of a passage 58 in which pressure fluid is available, thus admitting such pressure fluid to the chamber constituted by the upper end of the bore 32. The pressure fluid thus admitted to that chamber acts on the upper end of the plunger 30 to complete its movement with a rapid snap action and serves to retain the plunger in its lowered position after the dog 39 has passed on. Pressure fluid is, at such time, delivered to the passage 58 from the pump delivery line 49 through a branch passage 59 from the latter, thence through a dwell valve 60 which will later be described, a passage 61, the lower end of the bore 31 for the direction valve and a passage 62 from the latter with which the passage 58 communicates. The plunger of the direction valve 27 being raised, it does not block the passage 61 at such time. The speed valve 28 having been shifted downward in the manner described, it blocks direct communication between the exhaust passages 50, 52 so that fluid from the passage 50 is compelled to flow through the restricted orifice 55 and thence to the main exhaust passage 52. Consequently, the actuator piston 20 thereafter moves at a slow feed rate determined by the setting of the orifice 55.

At the completion of the desired advancing movement for the table 10 the dog 38 depresses the plunger of the direction valve 27, thereby switching connections for the actuator lines 47, 48 with reference to the pressure and drain lines so that pressure fluid is supplied to the line 47 and the line 48 connected to exhaust passage 51, effecting a reversal of actuator movement. Completion of the dog initiated lowering of the direction valve plunger with a rapid or snap action is accomplished with fluid pressure. As the direction valve plunger 29 moves down, a passage 29h in it is opened to a branch passage 52a from the main exhaust passage 52 so that fluid is exhausted from beneath the plunger to permit rapid completion of its descent under the influence of pressure continuously applied to the upper end of the differential valve plunger 27 from the pressure line 49. An alternative path for supply of pressure fluid from the line 49 through groove 29b to the top of the plunger 29 is also afforded through a passage 29i indicated in dotted lines in Fig. 2. In response to the shifting of the directional valve 27 the speed valve 28 is restored to its upper or rapid traverse position, by an arrangement which will shortly appear, so that fluid may pass freely from the exhaust passage 51 to the main exhaust passage 52 for returning the table at a rapid rate toward its starting position.

When the table reaches its starting position the piston 20 abuts against the right hand end of the cylinder 19 arresting further movement. To cushion the shock at stoppage of the table in such starting position, the supply passage 46 is located sufficiently far from the end of the cylinder that it will be covered by the piston as the latter approaches the cylinder end. The final increment of fluid expelled from the righthand end of the piston is thus compelled to emerge through an auxiliary port 46a connected to the line 48 through a restricted orifice 46b. A check valve 46c is arranged between the line 48 and passage 46a so that movement of the piston will not be retarded upon starting of the actuator in its opposite or advance direction.

Of particular note is the arrangement disclosed for utilizing the direction valve 27 to reset the speed valve 28 automatically at the end of the table stroke. Such arrangement makes use of the exhausting of fluid from the chamber defined by the lower end of the direction valve bore 31 (incident to the heretofore described snap movement of the plunger for the direction valve) for restoring the speed valve plunger to its outthrust or upper position.

Upon connection of the lower end of the direction valve bore 31 to exhaust, as an incident to lowering of the plunger 30 of this valve as heretofore described, the upper end of the bore 32 for the speed valve plunger 30 is also connected to exhaust through the passage 58. Consequently the speed valve plunger 30 starts upward rapidly under the urging of the spring 57. It is to be observed that such initiation of speed valve resetting takes place in response to lowering of the direction valve plunger irrespective of whether the latter be effected by hand or automatically by a dog. The port at the terminus of the passage 58 is, however, blocked by the land 30b after the speed valve plunger 30 has moved upward only a short distance. Thereafter fluid can escape from above the plunger 30 only through a longitudinal passage 30g in the same plugged at its lower end and communicating with a restricted orifice 30h opening into a recess 32a in the side of the bore 32. This latter recess connects with the main exhaust passage 52. Consequently the speed valve plunger 30 continues its movement on upward, but at a slow rate, until an annular groove 30i in it is uncovered by the recess 32a. A cross-passage in the plunger leads from the passage 30g and opens into this groove so that thereafter fluid can escape to the exhaust passage 52 free of the obstruction of the orifice 30h, thereby insuring completion of the final portion of the upward movement of the speed valve plunger with a rapid snap action.

In general then, it will be seen that when the speed valve plunger is automatically reset to its upper or rapid traverse position, it moves first with a rapid movement, then with a slow movement, and finally finishes up with a rapid movement again. The slow movement is introduced in order to afford a time interval for decelerating the spindle drive motor in a manner which will next appear.

Provision has been made in the disclosed controls for starting and stopping the spindle drive motor 17 in timed relation with the cycling of the table 10. In machines of the type illustrated, it is normally desirable that the spindle motor operate only during the actual machining operations so that it may remain idle both during approach of the work to the tool and during retreat of the work after machining is completed. In the present instance, a switch 63 (Fig. 8) is utilized for stopping and starting the spindle drive motor 17 and may operate directly in the latter's electric supply circuit or through intermediate contactors or relays (not shown) if desired. Moreover, a brake mechanism is provided for the spindle, being designated generally by the numeral 64. This brake is operated by a hydraulic actuator 65 comprising a stationary cylinder 66 and slidable piston 67. When the piston is displaced to the right as shown in Fig. 8, the brake is applied, the brake being released upon shift of the piston to the left. The switch 63 is also fluid-operated and comprises stationary contacts 68 as well as a movable contact 69 which is spring urged to open position in which it deenergizes the motor 17. Application of fluid pressure to a plunger 70 connected to the contact 69 shifts the latter to closed position to energize the motor.

While the table 10 is standing idle at its starting position and during the rapid approach movement of the table, pressure fluid is supplied through the branch passage 71 from the pressure line 49 to the left end of the brake actuator cylinder 65, thus urging the piston 67 to the right into its brake-applying position. Moreover, a passage 72 is connected to the exhaust, the same leading to the right end of the brake actuator cylinder 75 and to the bore receiving the switch operating plunger 70. Connection of the passage 72 to exhaust is accomplished through the speed valve 28, the latter having a groove 30d in its plunger 30, intermediate lands 30e, 30f, and which interconnects ports communicating respectively with the passage 72 and the main exhaust passage 52. The brake 64 is thus retained applied and the motor switch 63 open.

Depression of the speed valve 28 not only changes the rate of table movement from rapid traverse to a slow feed speed in the manner heretofore described, but also automatically starts the spindle drive motor 17. Thus when the plunger of the speed valve is depressed, the land 39e blocks communication between the passage 72 and the exhaust passage 52 while lowering of the land 30f establishes communication through the groove 30d between the passage 72 and a passage 73. The latter leads through a manually operable selector valve 74 (inserted for a purpose which will appear below) to the passage 62. The latter passage is connected to the pressure supply line 49 in the manner heretofore described during the time that the direction valve 27 is in its upward position for advancing movement of the table. Pressure fluid is accordingly supplied through the passage 72 to the switch actuator plunger 70, causing the latter to close the switch 63 and at the same time to the righthand end of the brake actuator cylinder 66. Since the piston 67 in the latter is differential it is shifted to the left, releasing the brake 64. The spindle motor is thus started promptly upon institution of feed movement for the table.

It is notable that at the end of the forward feeding movement for the table, the stoppage of the spindle motor 17 is normally accomplished in response to shift of the direction valve 27 rather than in response to the shift of the speed valve 28 which initiated the spindle motor operation. The direction valve, rather than the speed valve, is desirably used for stopping the spindle motor in order that the change from slow feed to rapid traverse may be delayed slightly at the point of reversal, thereby affording time for bringing the spindle to a stop before the table is speeded up in its return stroke. Spiraling of any drag-out line on the completed hole through which the tool is withdrawn is thus avoided. In the arrangement illustrated, the chamber defined by the lower end of the bore 31 for the plunger of the direction valve 27 is connected to exhaust, as heretofore described, upon depression of the direction valve plunger 29. Consequently, the line 72 leading to the spindle brake and switch actuators is connected to the exhaust through 72—32d—73—74—62—29h—52a—52 so that deenergization and braking of the spindle motor are instituted at the instant of reversal. In view of the fact that the speed valve 28 shifts slowly to its high speed position as heretofore described ample time is afforded for deceleration of the spindle motor before rapid motion of the table ensues.

It is to be observed that as the speed valve plunger 30 rises, blocking the connection between passages 62 and 72, it reconnects the latter passage directly to the main exhaust passage 52 so that the passage 72 remains exhausted retaining the spindle motor idle until a feed motion for the table is again instituted.

In some instances it is desirable to move the table 10 at a feed speed during a portion of its return stroke as well as during a portion of its advance. In such case, the alternative dog arrangement of Fig. 5 may be employed. As there indicated, the direction valve 27 is actuated by the same dog 38 previously employed for it, but a two-way dog 39a for operating the speed valve 28 is substituted for the one-way dog 39 previously described. The dog 39a is elongated in form so as to retain the speed valve depressed through the entire length of feed stroke required. The dog 39a remains in engagement with the speed valve 28 throughout the feed portions of both the advance and return movements of the table. While such arrangement serves effectually to maintain the table in feed during the desired portion of its return stroke, revision must be made for disabling the direction valve against stopping the spindle motor 17 during such a cycle. It is for that purpose that the selector valve 74 heretofore mentioned is included in the circuit. By turning it from the position of Fig. 8 in which it connects passages 62, 73 to a position in which it connects passages 73 and 49b, the speed valve 28 is rendered operative to stop as well as start the spindle motor 17 while the direction valve is rendered ineffectual to stop the spindle motor.

In some instances it is desirable to cause the table 10 to dwell at the end of its forward stroke for a predetermined time interval before reversing as, for example, to clean up the bottom of a blind hole. To that end the dwell valve 60 heretofore mentioned is incorporated in the system. When boring a blind hole or performing some similar operation, the point of stoppage for the table at the completion of its forward feed must be determined with greater precision than is possible with dog operation of the control valve. Consequently a fixed stop is provided against which the table may abut. Such an arrangement is indicated in Fig. 4 wherein is shown a screw 75 adjustably threaded in a bracket 76 on the table 10 and positioned to abut against a fixed stop 77 on the base 12.

When the nose of the screw 75 bears up against the stop 77 further forward movement of the table 10 is positively arrested. As an incident to such arrest of the table motion the expulsion of fluid from the actuator cylinder 19 by the forward face of the piston 20 is stopped so that the upstream pressure on the feed orifice 55 drops substantially to zero. This diminution in pressure is used for actuating the dwell valve 60.

Upon reference to Fig. 8 it will be seen that the dwell valve 60 comprises a plunger 78 slidable in a bore 79, fashioned within the panel 26. A compression spring 80 yieldably urges the plunger 78 to the right, such movement being resisted by fluid pressure applied from the pump delivery line 49 through the passage 59. The spring pressure is, however, augmented by pressure applied to its lefthand end through a passage 80a leading from the actuator conduit 47 connected to the left end of the cylinder 19. So long as the table 10 is moving forward in either rapid traverse or feed, the pressure in the passage 80a is sufficient that it, together with the spring 80, retains the dwell valve plunger 78 shifted to the right in the position shown in Fig. 8. Incidentally, it will be noted that when the table actuator 18 is moving in reverse direction the line 47 is connected to the pump 22 so that ample pressure is available in the branch passage 80 for retaining the dwell valve plunger 78 in its righthand position.

So long as the dwell valve plunger 78 remains in the righthand position shown in Fig. 8, passages 59, 61 remain in communication and a passage 81 leading to an adjustable orifice 82 and thence to the exhaust line 52 remains blocked.

When the forward movement of the table 10 is positively arrested, as by engagement of the stops 75, 77 heretofore noted, the pressure in the passage 80a falls substantially to zero, whereupon the pump pressure in passage 59 overcomes the spring 79, causing the dwell valve plunger 78 to shift to the left (see Fig. 9). This cuts off the supply of pressure fluid from the passage 59 to the passage 61 leading to the lower end of the direction valve 27 and instead connects the passage 61 to the restricted orifice 82. Consequently, fluid from the chamber defined by the lower end of the direction valve plunger bore 31 drains out slowly through the restricted orifice 82. After a time interval determined by the setting of the orifice 82, the direction valve plunger 29 lowers sufficiently that the internal passage 29h in it communicates with the end of the passage 52a for completion of the lowering of the direction plunger with a snap action as heretofore described. The dwell of the table at the end of its advance stroke may thus be determined with nicety by adjustment of the orifice 82.

I claim as my invention:

1. In a mechanism for controlling the operation of a reversible hydraulic actuator reciprocable toward and from a fixed limit position therefor, the combination of means including a two-position direction valve element for reversely connecting the actuator to a source of pressure fluid and to exhaust for movement of said actuator in respective opposite directions, means including a two-position speed control valve element for establishing either of two alternative rates of movement for said actuator corresponding respectively to the two positions of said speed valve element, one being a rapid traverse rate and the other a comparatively slow feed rate, spring means for yieldably urging said speed control valve element toward its position corresponding to the rapid traverse rate, manually operable means for shifting said direction valve element to a position for advance of the actuator away from said fixed limit position for the latter, means responsive to a completion of a preset movement of the actuator away from said limit position for shifting said speed valve element from its rapid traverse to its feed position and for subsequently moving said direction valve element to reverse said actuator upon completion of a preset length of travel of the latter at said feed speed, said responsive means including passages for applying pressure fluid to one end of said speed control valve element in opposition to the action of said spring means, and means including a fluid passage in said direction valve element operable in response to shift of said direction valve element into its reversing position for exahusting pressure fluid from said one end of said speed valve element and permitting return of the same to its rapid traverse position under the action of said spring means.

2. In a mechanism for controlling a reversible hydraulic actuator, the combination of means including a two-position direction valve element for reversely connecting the actuator to a source of fluid and to exhaust for movement of said actuator in respective opposite directions, means including a two-position speed control valve element for establishing either of two alternative rates of movement for said actuator corresponding respectively to the two positions of said speed control valve element, resilient means adapted to urge said speed control valve element toward one of said positions, means operable in response to completion of a predetermined movement of said actuator for applying pressure fluid to one end of said speed valve element to shift the same from said one position to another in opposition to the action of said resilient means, and means for exhausting pressure fluid from said one end of said speed control valve element upon movement of said direction valve element from one position thereof to the other, said movement of said direction valve element thereby effecting restoration of said speed valve to said one position of the latter due to the action of said resilient means.

3. In a mechanism for controlling a reversible hydraulic actuator, the combination comprising individually shiftable direction and speed control valve elements each shiftable from one position thereof toward another, dog means for initiating movement of each of said valve elements from said one position to said other, and fluid operated means for not only automatically completing the dog initiated movement of each of said valve elements from said one position thereof to the other but for also effecting the shift of said speed valve element toward its one position.

4. In a mechanism for controlling a reversible hydraulic actuator, the combination of individually shiftable direction and speed control valve elements each adapted to be dog operated from one position thereof toward another, spring means yieldably biasing said speed valve element toward said one position therefor, means for applying fluid pressure to said speed valve element in response to shift of the same toward said other position therefor to retain the same in the latter position against the bias of said spring, and means operable in response to shift of said direction valve away from said one position therefor for relieving the pressure applied to said speed valve means by said fluid applying means.

5. In a mechanism for controlling a reversible hydraulic actuator, the combination of individually shiftable direction and speed control valve elements each adapted to be dog operated from one position therefor toward another, spring means for yieldably biasing said speed valve element toward said one position therefor, means for applying fluid pressure to said speed valve element in response to shift of the same toward said other position therefor to retain the same in the latter position against the bias of said spring, and means operable in response to shift of said direction valve away from said one position therefor for not only applying fluid pressure to said direction valve element in a manner to complete such shift thereof with a rapid snap action but for also simultaneously relieving the pressure applied to said speed valve element by said pressure applying means.

6. In a mechanism for controlling a reversible hydraulic actuator, the combination of means including a two-position direction valve element for reversely connecting the actuator to a source of fluid and exhaust for movement of said actuator in respective opposite directions, an adjustable restricted orifice, means including a two-position speed control valve element for effecting the flow of fluid discharged from the actuator either through said orifice or alternatively substantially unrestrictedly to exhaust, whereby to effect movement of said actuator at either of two corresponding rates of speed, means operable in response to completion of a predetermined movement of said actuator for shifting said speed control valve element to the position thereof in which it effects the flow of fluid through said orifice, and means including a fluid passage in said direction valve element for utilizing a movement of the latter from one position thereof to the other for effecting urging of said speed valve element back toward its other position.

7. In a mechanism for controlling a reversible hydraulic actuator of the piston and cylinder type having supply passages communicating with opposite ends of the cylinder, the combination of means including a two-position direction valve element for reversely connecting respective ones of said passages to a source of pressure fluid and to exhaust, whereby to effect movement of said actuator in respective opposite directions, an adjustable restricted orifice interposed in one of said passages, means including a two-position speed control valve element for establishing and blocking a by-pass passage about said orifice in the respective alternate positions of said speed valve element, means operable in response to completion of a predetermined movement of said actuator for shifting said speed valve element into its blocking position, and means including fluid passages in said valve elements for utilizing a movement of the latter from one position thereof to the other to permit the return of said speed valve element from its blocking position to its by-pass position.

8. In a mechanism for controlling a reversible piston and cylinder type hydraulic actuator having fluid supply passages communicating with opposite ends of said cylinder, the combination of a pair of individually adjustable restricted orifices, means including a two-position direction valve element for reversely connecting respective ones of said passages to a source of pressure fluid and through respective ones of said orifices to exhaust, the connection being established from one of said passages through one of said orifices to exhaust in one position of said valve element and from the other of said passages through the other of said orifices to exhaust in the other position of said valve element, and means including a two-position speed control valve element for establishing by-pass connections about both of said orifices when said speed valve element is in one position and for blocking said by-pass connections when said speed valve element is in its alternative position.

9. In a mechanism for controlling a reversible piston and cylinder type hydraulic actuator having fluid supply passages communicating with opposite ends of said cylinder, the combination of a pair of individually adjustable restricted orifices, means including a two-position direction valve element for reversely connecting respective ones of said passages to a source of pressure fluid and to exhaust through respective ones of said orifices, the connection being established from one of said passages through one of said orifices to exhaust in one position of said valve element and from the other of said passages through the other of said orifices to exhaust in the other position of said valve element, means including a two-position speed control valve element for establishing by-pass connections simultaneously about both of said orifices when said speed valve element is in one position and for blocking both of said by-pass connections when in its other position, spring means for yieldably urging said speed control valve element into said one position, means operable in response to completion of a predetermined movement of said actuator for shifting said speed control valve element from said one position thereof to said other position, and means for utilizing a movement of said direction valve element from one position thereof to the other to permit restoration of said speed valve element to said one position of the latter under the action of said spring means.

10. In a mechanism for controlling a reversible hydraulic actuator, the combination of a direction valve and a speed valve, each of said valves including a corresponding plunger shiftable between two alternate positions therefor as well as a chamber in each valve for applying pressure fluid to an end of the corresponding valve plunger, means for supplying pressure fluid to each of said chambers in response to shifting of the corresponding plungers away from said chambers in order to retain the plungers in such shifted position, means responsive to completion of a predetermined movement of the associated actuator for initiating movement of said plunger of said direction valve toward its corresponding chamber, and means responsive to the initiation of such movement for simultaneously exhausting fluid from both of said chambers.

11. In a mechanism for controlling the operation of a reversible hydraulic actuator having a pair of supply passages connectible reversely to a source of pressure and to exhaust, the combination of a reversible direction valve having a plunger and a chamber at one end of said plunger, said plunger being shiftable between alternate positions therefor in accordance with whether said chamber is connected to a source of pressure fluid or to exhaust, a restricted adjustable orifice, means including a dwell valve having a plunger shiftable between first and second alternate positions for connecting said chamber to a source of pressure fluid in said first position of said dwell valve plunger and for connecting said chamber to exhaust through said restricted orifice in said second position of said dwell valve plunger, a spring for yieldably urging said dwell valve plunger into said first position, a positive stop for arresting the movement of the actuator in one direction, and means for applying to said dwell valve plunger a fluid pressure augmenting said spring and which is substantially proportional to the fluid pressure in the one of said actuator supply passages through which fluid is expelled from the actuator as the latter advances toward said stop.

12. In a mechanism for controlling a hydraulic actuator, the combination comprising means including a speed control valve having a plunger shiftable between alternate positions for conditioning the associated actuator for movement either at high or low speed in accordance with the position of said plunger, spring means for urging said plunger toward its high speed position, means for applying pressure fluid to one end of said plunger to hold the same in its low speed position in opposition to the action of said spring means, direction valve means for relieving fluid pressure at said one end of said plunger and permitting return of the same toward said high speed position with a rapid initial movement under the action of said spring means, means adjacent said one end of said plunger defining a chamber adapted to trap pressure fluid therein after said rapid initial movement of said plunger, and means including a fluid passage in said plunger communicating with said chamber, an orifice element in said plunger adapted to exhaust pressure fluid from said chamber at a relatively slow rate reflected in further movement of said plunger at a proportionally slow rate, and means defining an additional passage in said plunger for by-passing said orifice to permit completion of said plunger movement with a rapid snap action.

13. In a mechanism for controlling a hydraulic actuator, the combination of means including a speed control valve having a plunger shiftable between two alternative positions for effecting movement of the associated actuator at either high or low speed in accordance with the position of said plunger, a spring for yieldably urging said plunger toward its high speed position, means operable by said actuator for moving said plunger from its low speed position to its high speed position against the bias of said spring upon completion of a predetermined movement of said actuator, said valve having a chamber adjacent the end of said plunger which trails as the plunger moves toward its low speed position, means including a port controlled by said plunger for admitting pressure fluid to said chamber when said plunger moves into its low speed position for retaining the plunger in such position, means for connecting said port to exhaust to relieve the pressure in said chamber and thereby initiate movement of said plunger toward its high speed position, said port being positioned to be blocked by said plunger upon the completion of a small portion of said plunger's movement toward its high speed position, and means including a second port controlled by said plunger together with a restricted orifice for completing the exhausting of fluid from said chamber at a slow rate during at least a portion of the remainder of the movement of said plunger toward its high speed position.

PAUL J. ESTERLINE.

REFERENCES CITED

The following references are of record in the file of this patent:

UNITED STATES PATENTS

| Number | Name | Date |
| --- | --- | --- |
| 1,885,070 | Balsiger | Oct. 25, 1932 |
| 2,012,273 | Fraser | Aug. 27, 1935 |
| 2,017,999 | West | Oct. 22, 1935 |
| 2,042,379 | Barnes et al. | May 26, 1936 |
| 2,091,425 | Wood | Aug. 31, 1937 |
| 2,157,240 | Keel | May 9, 1939 |
| 2,181,055 | Hirvonen | Nov. 21, 1939 |
| 2,237,871 | Stone | Apr. 8, 1941 |
| 2,285,069 | Vickers | June 2, 1942 |
| 2,392,074 | Wasson | Jan. 1, 1946 |